United States Patent [19]

François et al.

[11] 4,179,035
[45] Dec. 18, 1979

[54] BALANCED ARTICULATED MANIPULATOR

[75] Inventors: Daniel François, Vendome; Jean-Claude Germond, Paris; Paul Marchal, Gif-sur-Yvette; Jean Vertut, Issy les Moulineaux, all of France

[73] Assignee: Commissariat a l'Energie Atomique, Paris, France

[21] Appl. No.: 862,152

[22] Filed: Dec. 19, 1977

[30] Foreign Application Priority Data

Dec. 22, 1976 [FR] France .................. 76 38698

[51] Int. Cl.² .............................................. B25J 1/02
[52] U.S. Cl. .................................................. 414/2
[58] Field of Search .............. 214/1 R, 1 B, 1 BC, 214/1 BD, 1 BS, 1 BH, 1 BV, 1 CM, 151, 1 BN

[56] References Cited

U.S. PATENT DOCUMENTS 3,280,991  10/1966  Melton .......................... 214/1 CM

FOREIGN PATENT DOCUMENTS 1478911  7/1969  Fed. Rep. of Germany ....... 214/1 CM

Primary Examiner—Albert J. Makay
Assistant Examiner—George F. Abraham
Attorney, Agent, or Firm—Pearne, Gordon, Sessions

[57] ABSTRACT

A master-slave manipulator which penetrates an enclosure wall through an opening fitted with a mounting plate has a slave arm and master arm pivoted respectively to each end of a pivotally mounted central cylindrical body and constituted by one or more articulated cylindrical segments in end-to-end relation. A tool or tong unit is fitted at the slave end while a control handle and balance weight are fitted at the master end. The segments of the master arm are in an inverted homothetic relationship with those of the slave arm with respect to the point of intersection of the axis of the central body with the pivotal mounting axis and are in a ratio equal to $-k$ while the weights of the homothetic segments are in a ratio of $1/k$. The movements transmitted by the master arm to the slave arm ensure that, at each instant, the angle made by the two homothetic segments of the slave arm are equal and opposite, the dimensions of one segment of the master arm being equal to $k$ times those of the corresponding slave segment.

3 Claims, 6 Drawing Figures

BALANCED ARTICULATED MANIPULATOR

BACKGROUND OF THE INVENTION

This invention relates to an articulated and balanced manipulator.

Systems for remote handling operations include the so-called master-slave manipulators which are already well-known and in wide use. A manipulator of this type comprises a master portion controlled by the operator and a slave portion which reproduces the movements of the master portion, a gripping device or tool being carried by the manipulator at the slave end. Master-slave manipulators are often designed for work conducted within enclosures or caves which are usually shielded. The thickness of the shielding wall is variable but always ranges from a minimum thickness of 5 centimeters to a thickness of 1 meter. The master arm remains outside the enclosure and the manipulator extends through the wall.

When the operator of a master-slave manipulator actuates the control handle by hand, the same movements are reproduced by the tong unit or gripping device. Conversely, the reversibility of the transmission between the master portion and the slave portion produces a feedback force. The manipulator consequently enables the operator to sense the efforts exerted or encountered by the tool or gripping device at the slave end and in particular to feel the mass or weight of objects being handled. Furthermore, a manipulator of this type is balanced with respect to gravity and is consequently indifferent in the case of all his movements when operating on no load.

In another known category are the so-called power manipulators which are usually driven by an electric motor and penetrate completely within the installations instead of passing through the shielding wall as in the case of manipulators of the previous type.

Finally, there is another known type of power manipulator having bilateral control which produces the same feedback forces and the same integrated direct control from a single operating handle as the manipulators of the first type referred-to in the foregoing.

The above-mentioned first type does not permit the handling of large masses; this is the case in particular if the object to be handled is not a variable object contained within the work enclosure but becomes an object of constant and substantial weight such as a television camera designed for surface inspection or a system for spraying with water at high pressure for decontamination purposes.

In the first and third cases mentioned above, the object or tool employed has to be carried continuously by the operator who is thus subjected to considerable fatigue. Power manipulators cannot readily operate within enclosures of very small size as is the case in particular when it is desired, for example, to decontaminate portions of primary circuits of nuclear reactors by means of water under pressure or to carry out inspections in such circuits.

To this end, the manipulator in accordance with the invention is intended to carry out balancing of a tool other than a tong unit while ensuring that mobility of the tool within a sealed enclosure is achieved. The manipulator in accordance with the invention further permits of penetration into the interior of the enclosure in any desired direction through an orifice having small dimensions. Furthermore, balancing of the manipulator is ensured not only with respect to control of the load being handled but also with respect to its handling point for introduction of said manipulator into the enclosure or more precisely the introduction of its slave end.

To this end, the manipulator in accordance with the invention is continuously balanced irrespective of the deformations of said manipulator when this latter is attached to the wall of the enclosure in which it is desired to operate. The manipulator as a whole is also balanced at the time of initial installation and of transportation outside the enclosure with respect to a supporting shaft. In simplified terms, this result is obtained by giving homothetic shapes to the different elements of the slave arm and to the different elements of the master arm, said master arm being adapted to carry at least one balance weight.

SUMMARY OF THE INVENTION

This invention is precisely directed to a manipulator of the type comprising a master arm and a slave arm, said manipulator being capable of operating within an enclosure limited by a wall provided with an opening for the introduction of said slave arm into said enclosure. The manipulator essentially comprises a central body of cylindrical shape having an axis of revolution, a penetration plate being intended to be fixed on said enclosure wall at the level of said opening, said cylindrical body being pivotally mounted in said plate which defines a plane of attachment to said wall. Said central cylindrical body has a first extremity and a second extremity, a slave arm being pivoted to said first extremity and constituted by n segments of generally cylindrical shape which are mounted in end-to-end relation and articulated with respect to each other, the last segment being fitted with a tool. A master arm is pivoted to said second extremity and constituted by n segments of generally cylindrical shape which are mounted in end-to-end relation and articulated with respect to each other, the last segment being fitted with a control handle and with an adjustable balance weight. The segments of the master arm are in an inverted homothetic relationship with those of the slave arm with respect to the point of intersection of the axis of the central cylindrical body with the supporting axis and are in a homothetic ratio equal to k, (k being negative), the weights of the homothetic segments being substantially in a ratio equal to 1/k. Transmission means constituted by chains, belts, cables or tapes and by pulleys are provided for transmitting the movements of the master arm to the slave arm in such a manner as to ensure at each instant that the angle made by two segments of the master arm and the angle made by the two homothetic segments of the slave arm are equal and have parallel sides.

In accordance with a first distinctive feature, the penetration plate has a central portion of revolution which is rigidly fixed to the central cylindrical body and a peripheral portion which can be attached to said wall, said central portion being pivotally mounted in said peripheral portion.

In accordance with a second distinctive feature, the central portion of the penetration plate is provided with two handling trunnions having the same axis, said axis being such as to intersect the axis of said cylindrical body and being located in the vicinity of the attachment plane outside the enclosure.

In accordance with a third distinctive feature, the peripheral portion of the plate is constituted by a mounting plate adapted to be attached to said wall and by a cylindrical shell rigidly fixed to said mounting plate and said central portion of the penetration plate is constituted by a second cylindrical shell in coaxial relation with said central cylindrical body and rigidly fixed thereto, said second cylindrical shell being pivotally mounted within said first shell, said second shell being guided by said first shell over a predetermined distance in a direction parallel to the axis of said cylindrical body, said handling trunnion being such as to intersect the axis of said cylindrical body substantially at the mid-point of the distance aforesaid.

BRIEF DESCRIPTION OF THE DRAWINGS

A more complete understanding of the invention will in any case be gained from the following description of one embodiment which is given by way of example without any limitation being implied, reference being made to the accompanying drawings, wherein.

DETAILED DESCRIPTION OF THE PREFERRED EMBODIMENT

Figure 1:
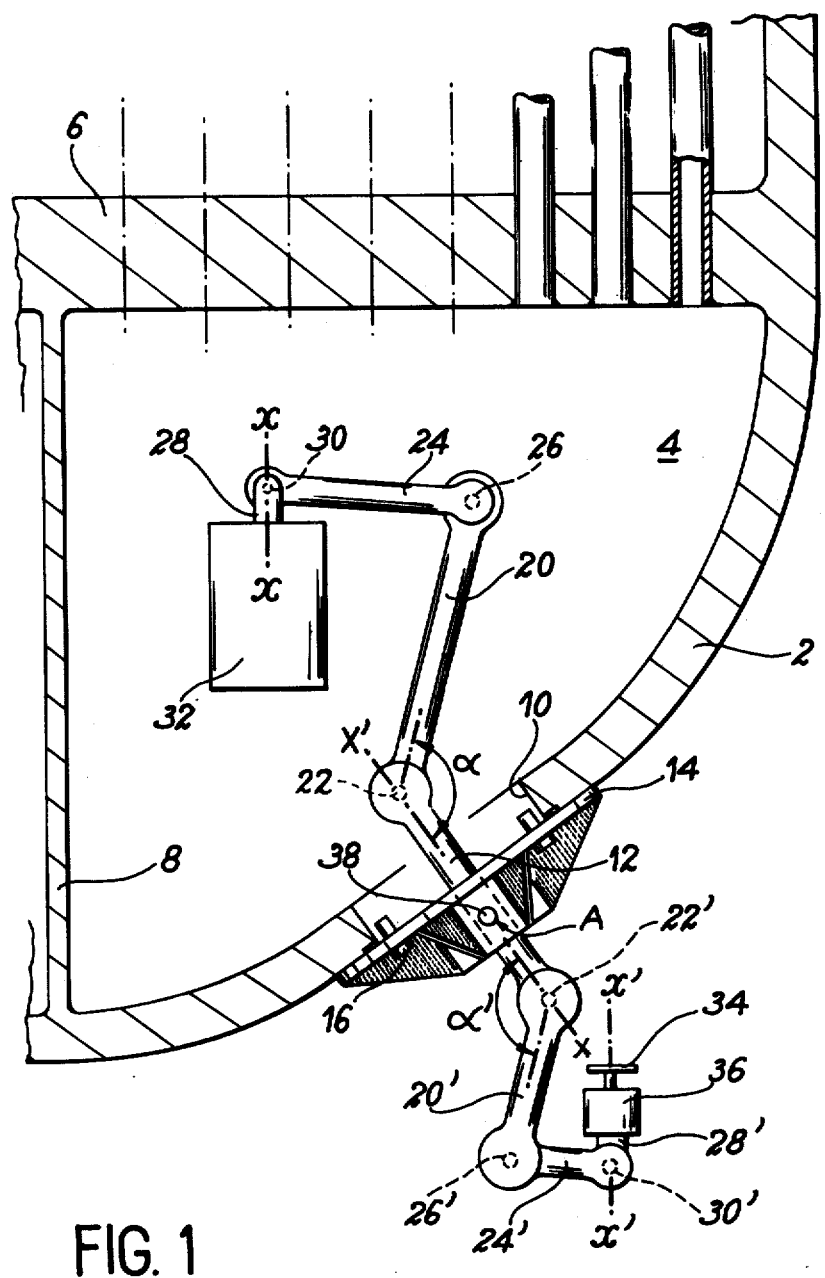
FIG. 1 is a vertical schematic view in which the manipulator in accordance with the invention is shown in position within the work enclosure.

As shown in FIG. 1, the manipulator in accordance with the invention is mounted on the wall of the enclosure within which it is intended to operate. In this particular case, the enclosure is located at the lower end of a heat exchanger for pressurized-water reactors. More specifically, this figure shows the lower end of the water-box 4 of the heat exchanger. The end of the slave arm of said manipulator is intended to operate inside the water-box 4 which is limited by the wall 2 of substantial thickness, by the tube-plate 6 and by a vertical partition 8. The manipulator is introduced into the water-box 4 through an opening 10 formed in the wall 2. It can readily be understood that, during normal operation, the opening 10 is closed by means of a seal plug (not shown in the drawings).

The manipulator in accordance with the invention comprises a central body 12 having a generally cylindrical shape and an axis of revolution X—X'. On this central body 12 are mounted respectively the master arm and the slave arm of the manipulator, the slave arm being located within the interior of the water-box 4 when the manipulator is placed in position and the master arm being located outside the enclosure in order to be readily accessible to the operator. The manipulator further comprises a penetration plate 14, the peripheral portion of which can be fixed on the wall 2. The central cylindrical body 12 is rotatably mounted within the penetration plate 14. Since said plate 14 is stationary, said central body 12 is therefore capable of rotating about the axis X—X'. Futhermore, the penetration plate 14 is fitted with through-tubes 16, especially with a view to providing a passageway for an optical and lighting apparatus and to enabling the operator to control the displacements of the slave arm within the work enclosure. The master arm and the slave arm are fixed respectively to the ends of the central cylindrical body 12. The slave arm comprises a first segment 20 which is pivoted with respect to the central cylindrical body 12 about the pin 22, said pin being rigidly fixed to the central body and at right angles to the axis X—X'. The slave arm has a second segment 24 pivoted about the pin 26 which is rigidly fixed to the segment 20 and parallel to the pin 22. A third segment 28 of said slave arm is pivoted about the pin 30 which is parallel to the pins 22 and 26. Said third segment supports a utilization device 32 which can be of variable character. Moreover, said segment is capable of rotating about its longitudinal axis x—x.

Likewise on the master-arm side, there is also shown a first segment 20' pivoted with respect to the central cylindrical body 12 about the pin 22' which is parallel to the pin 22, a second segment 24' pivoted about the pin 26' which is rigidly fixed to the segment 20' and a third segment 28' pivoted about the pin 30'. Said third segment 28' is fitted on the one hand with a control handle 34 and on the other hand with a set of adjustable balance weights 36, the design function of which will hereinafter be explained in greater detail. This segment is also capable of rotating about its longitudinal axis x'—x'.

In accordance with the essential feature of the invention, there is an inverted homothetic relationship between the master-arm elements and the slave-arm elements with respect to the point A. This point A is defined as the intersection of the axis X—X' of the central cylindrical body with a transverse axis. This transverse axis is in fact defined by two trunnions 38 located on each side of the central cylindrical body; as will be explained later, these trunnions serve to position the manipulator within the work enclosure. If $-K$ designates the ratio of the homothetic relationship, this clearly means that the algebraic length of the segments 20, 24 and 28 of the slave arm is in the ratio k with the algebraic lengths of the corresponding segments 20', 24' and 28'. The same ratio exists between the algebraic distance from the point A to the pin 22 and the distance from the point A to the pin 22'. This homothetic relationship ratio clearly exists in the same manner in a plane perpendicular to the plane of FIG. 1 as shown by way of example in FIG. 4 which illustrates the manipulator according to the invention in greater detail. From this figure it is apparent that, with respect to said point A, there is also a homothetic arrangement of the segments with respect to each other in the perpendicular plane aforesaid.

In order to obtain balancing about the trunnions 38, it is also clearly necessary to ensure in addition to the above-mentioned homothetic relationship that the weights of each pair of homothetic elements is in a ratio equal to the reverse of the homothetic relationship ratio $1/k$. It can be understood that balancing about the trunnions 38 is accordingly achieved under these conditions. In order to ensure this weight balancing, the segment 28' is adapted to carry balance weights 36. Once the tool 32 has been balanced by means of the weights 36, it is apparent that this balance is maintained by virtue of the homothetic relationship irrespective of the positions of the segments. It is clearly apparent that, in order to ensure that this homothetic relationship is maintained, the elements which give rise to pivotal movements of the segments 20, 24 and 28 of the slave portion are controlled by means of orders for the displacement of the master arm which are given by the corresponding segments 20', 24' and 28' of the master arm so as to ensure that the corresponding angles are equal at absolute value but opposite and having parallel sides. For example, the angle α made at each instant by the segment 20 with the central cylindrical body 12 is equal and opposite to the angle α' made by said central body 12 with the segment 20' of the master arm. The manner in which this angle maintenance is achieved by means of the drive system will be shown hereinafter in greater detail.

Figure 2:
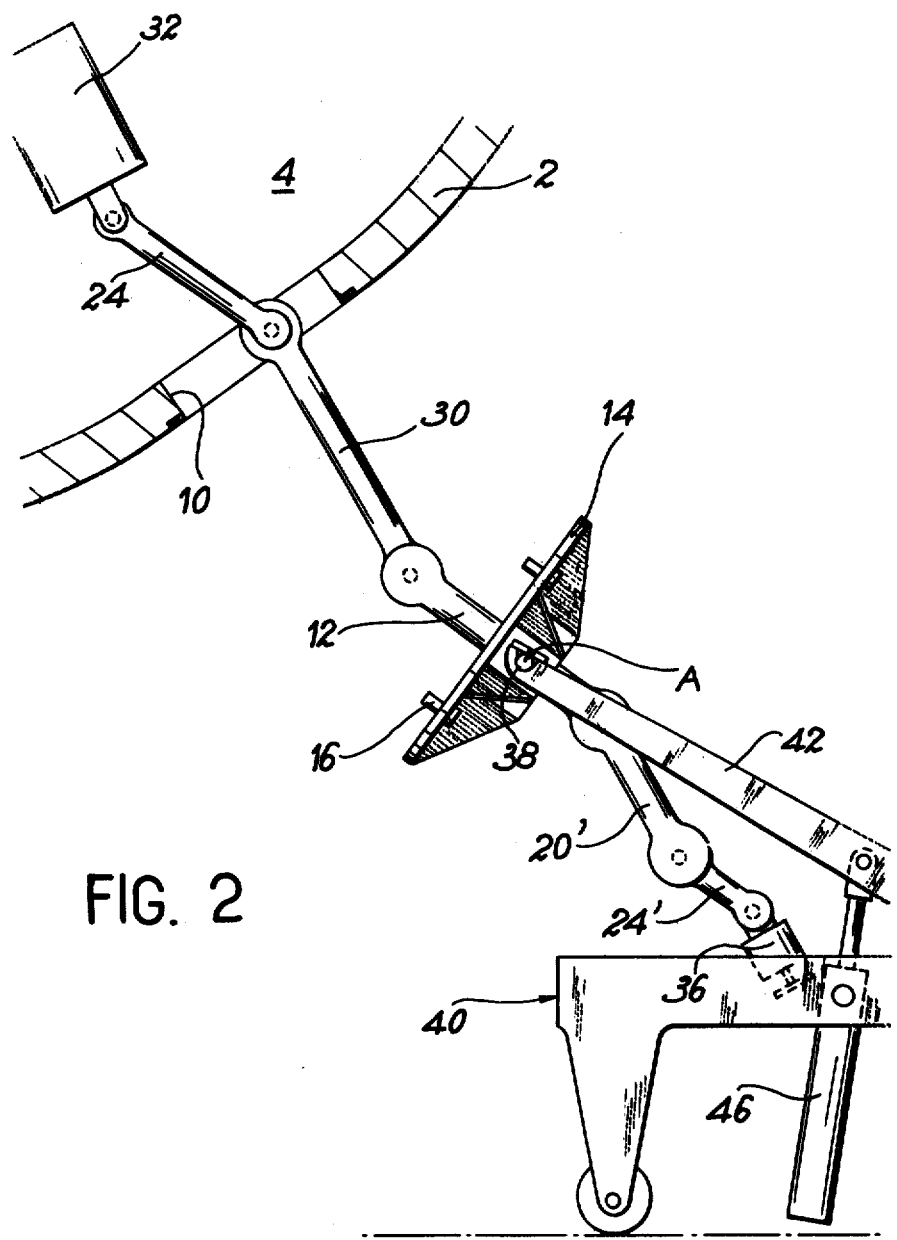
FIG. 2 is a view in which the same manipulator is shown at the time of introduction into the work enclosure by means of a support.
Figure 3:
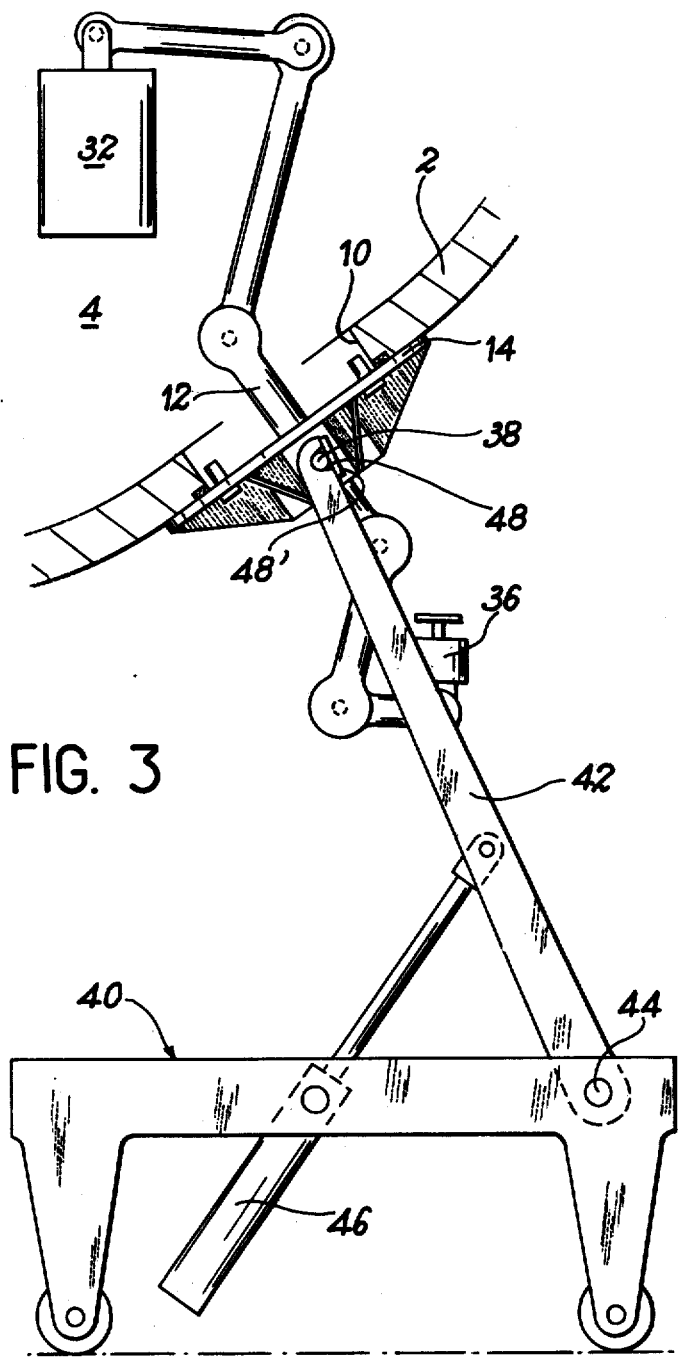
FIG. 3 is a view in elevation in which the same manipulator has been introduced into the work enclosure and is again shown on its support.

FIGS. 2 and 3 illustrate the mode of positioning of the manipulator on the wall of the work enclosure and serve to highlight one of the advantages offered by balancing of the manipulator with respect to the trunnions 38. Positioning is achieved by means of a moving carriage 40 fitted with a supporting arm 42. This supporting arm is pivoted about the horizontal pin 44 of the carriage 40 and pivotal motion of the supporting arm 42 is controlled for example by means of a control jack 46. The arm 42 is provided at the free end thereof with two semi-circular recesses such as the recess 48 which are capable of cooperating with the trunnions 38 of the manipulator and is also provided with a locking member 48'. It can be understood that, by virtue of homothetic balancing of the complete manipulator about the point A (located at the center of the common axis of the trunnions), the manipulator is accordingly balanced at the end of the supporting arm 42 irrespective of the positions of the different segments of the master arm and of the slave arm. In particular, FIGS. 2 and 3 show the movements which it is necessary to impart to the master and slave arms in order to permit introduction of the slave arm into the work enclosure 4 through the opening 10.

As will readily be understood, the homothetic relationship ratio between the master arm and the slave arm can be equal to 1, thus achieving symmetry with respect to the point A in this case. However, as a general rule, the space available on the master-arm side is smaller than that which is available on the slave side, namely within the work enclosure. For this reason, the homothetic relationship ratio k of the master arm with respect to the slave arm is smaller than 1 at absolute value. Moreover, the presence of the balance weights 36 on the master-arm segment 28 (that is to say on the accessible side of the manipulator) permits very easy adaptation of compensation for the weight of the work tool 32 when this latter has to be modified.

Figure 4:
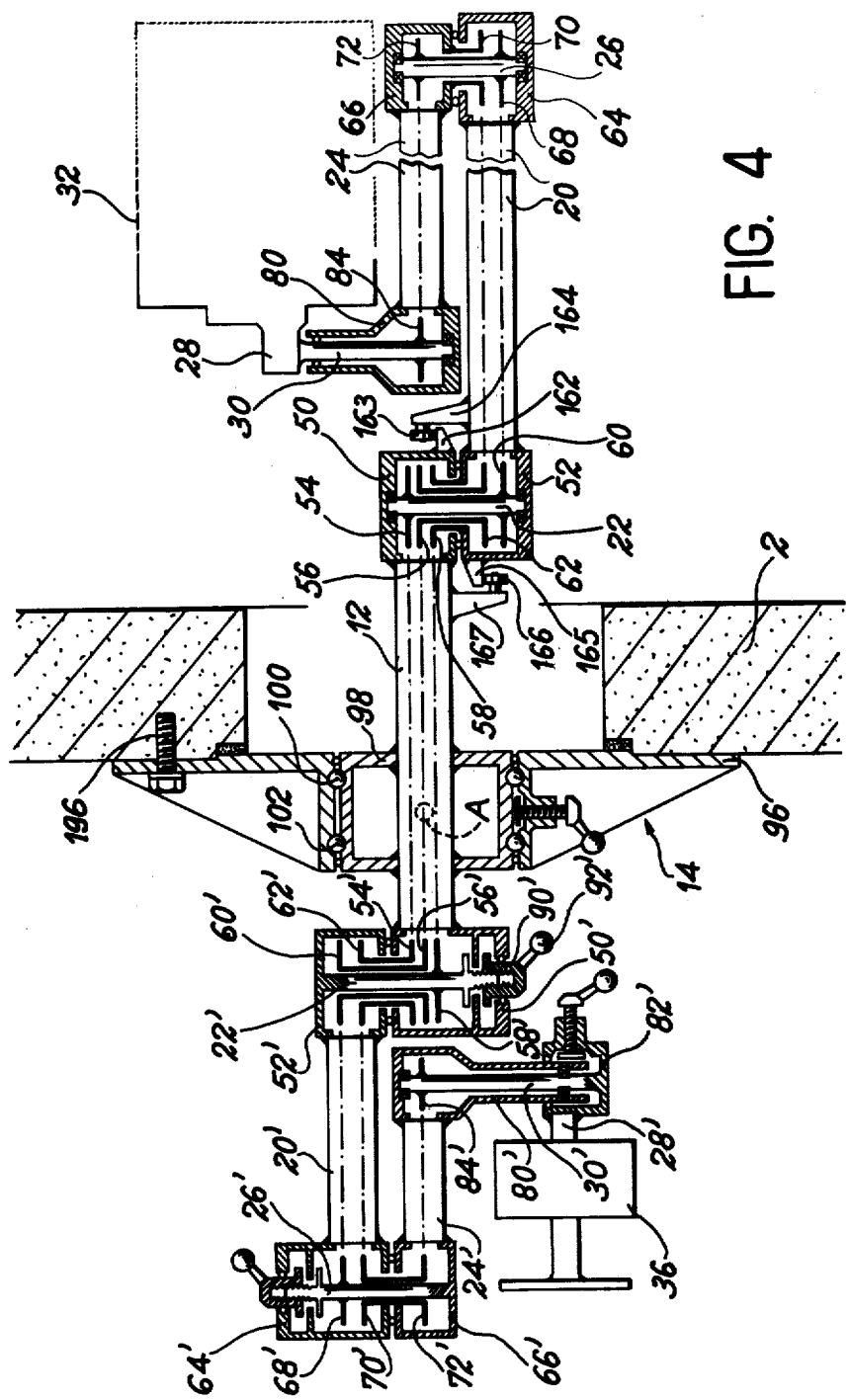
FIG. 4 is a horizontal sectional top view of the manipulator in which the master and slave arms are folded back.

One form of construction of the manipulator in accordance with the invention is shown in greater detail in FIG. 4. As can be seen in this figure, the homothetic correspondence which existed in the plane of FIG. 1 is again found to be present in the transverse plane of FIG. 4. In particular, it is seen that the different elements or segments constituting the master arm and the slave arm are displaced off-center with respect to each other and symmetrically with respect to the point A. Thus in FIG. 4, the segment 20' is located above the central cylindrical body 12 whereas the corresponding segment 20 of the slave arm is located below said central body. In particular, this figure shows in greater detail the axes of pivotal motion of the segments with respect to each other and the mode of motion transmission in which the slave arm is driven by means of the controlled movements of the master arm. Each articulation is made up of a pin and of two half-casings rigidly fixed respectively to each of the two segments to be assembled and containing chain-type motion-transmission pulleys. By way of example, if consideration is given to the articulation between the central cylindrical body 12 and the segment 20' of the master arm, the half-casing 50' is found to be rigidly fixed to the central cylindrical body 12 and the half-casing 52' is rigidly fixed to the segment 20'. The pin 22' is located inside these two half-casings. Similarly, the articulation between the slave-arm segment 20 and the central body 12 is provided by the pin 22 mounted within two half-casings designated by the reference numerals 50 and 52. In order to permit transmission of orders for pivotal movements of the master arm to the slave arm and conversely, the pins 22 and 22' as well as the pins 26, 30 and 26', 30' are fitted with pulleys over which the motion-transmission chains pass. Within the half-casing 50, for example, there are present the pulley 54 which cooperates with the pulley 54', the pulley 56 which cooperates with the pulley 56' and the pulley 58 which cooperates with the pulley 58'. Similarly, the half-casing 52' contains a pulley 60' which is rigidly fixed to the pulley 56' and the pulley 62' which is rigidly fixed to the pulley 54'. The casing 52 contains the symmetrical pulleys 62 and 60. Similarly, the half-casing 64' which is rigidly fixed to the segment 20' and the half-casing 60' which is rigidly fixed to the segment 24' are located at the level of the articulation between said segments 20' and 24'. These half-casings contain respectively the pulley 68' which is rigidly fixed to the pin 26' and the pulley 70' which is rigidly fixed to the pulley 72'. Within the corresponding half-casings 64 and 66 of the slave arm are located the corresponding pulleys 68, 70 and 72. Finally, the half-casing 80' and the half-casing 82' are located at the level of the pin 30'; said half-casing 82' contains the pulley 84' which is rigidly fixed to the pin 30'. Similarly, the pulley 84 which is rigidly fixed to the pin 30 is located within the half-casing 80.

It is readily apparent that, by means of these different pulleys and chains (belts, cables or tapes) which connect the corresponding pulleys, a movement of the master arm gives rise to a homothetic movement of the slave arm in accordance with the invention.

The mode of attachment of the two half-casings 50 and 52 is similar to that shown in FIG. 4. They are rotatably mounted on the stack of coaxial members 22, 56—26, 54—60, and forces applied transversely with respect to the plane of the arm produce substantial bending couples at this level. For this reason, a downward transfer of forces to the ring 162 rigidly fixed to the half-casing 50 is performed by a bearing roller 163 carried by the support bracket which is rigidly fixed to the segment 20.

Similarly, the upward forces are transferred to a ring 165 rigidly fixed to the half-casing 52 by the bearing roller 166 carried by the support bracket 167 which is rigidly fixed to the central cylindrical body 12. It will be noted that the rings 162 and 165 are partial and interrupted in the vicinity of the cylindrical body 12 and of the segment 20 which limit the angular displacement of the pivot-pin articulation 22 by applying rollers against said segments.

It should be noted in addition that each articulation of the master arm is fitted with a brake system which serves to lock the master arm in a given position and makes it unnecessary for the operator to hold the arm in this position. It is readily apparent that the position-maintenance of the master arm results in corresponding position-maintenance of the slave arm. This is of special interest, for example, if the tool 32 which is fixed to the end of the slave arm is intended to work in a given position over a long period of time. These brake systems consist for example of friction devices as designated by the reference 90′, these devices being controlled by means of operating levers such as the lever 92′ for locking the pivot-pin in the required position. Each of the three articulations 22′, 28′ and 30′ is equipped with a brake system of this type which will be described in greater detail hereinafter.

The penetration plate 14 is so designed in practice as to have a peripheral portion 96 provided with members for fixing this latter on the wall 2 (the fixing members are not shown in the drawings) and a central portion 98 which is rigidly fixed to the central cylindrical body 12. Ball-bearings such as those designated by the references 100 and 102 permit free pivotal movement of the central portion 98 within the stationary portion 96 about the axis X—X′ of the central body while preventing translational displacement. A brake system is also provided in order to arrest said pivotal movement. In the example shown in FIG. 4, the axis X—X′ is at right angles to the plane of the penetration plate 14. It can readily be understood that the axis just mentioned could be inclined with respect to said plate at any desired angle. The axis of the trunnion A is in the plane which is equidistant from the planes of the two rings of balls 100 and 102.

Figure 5:
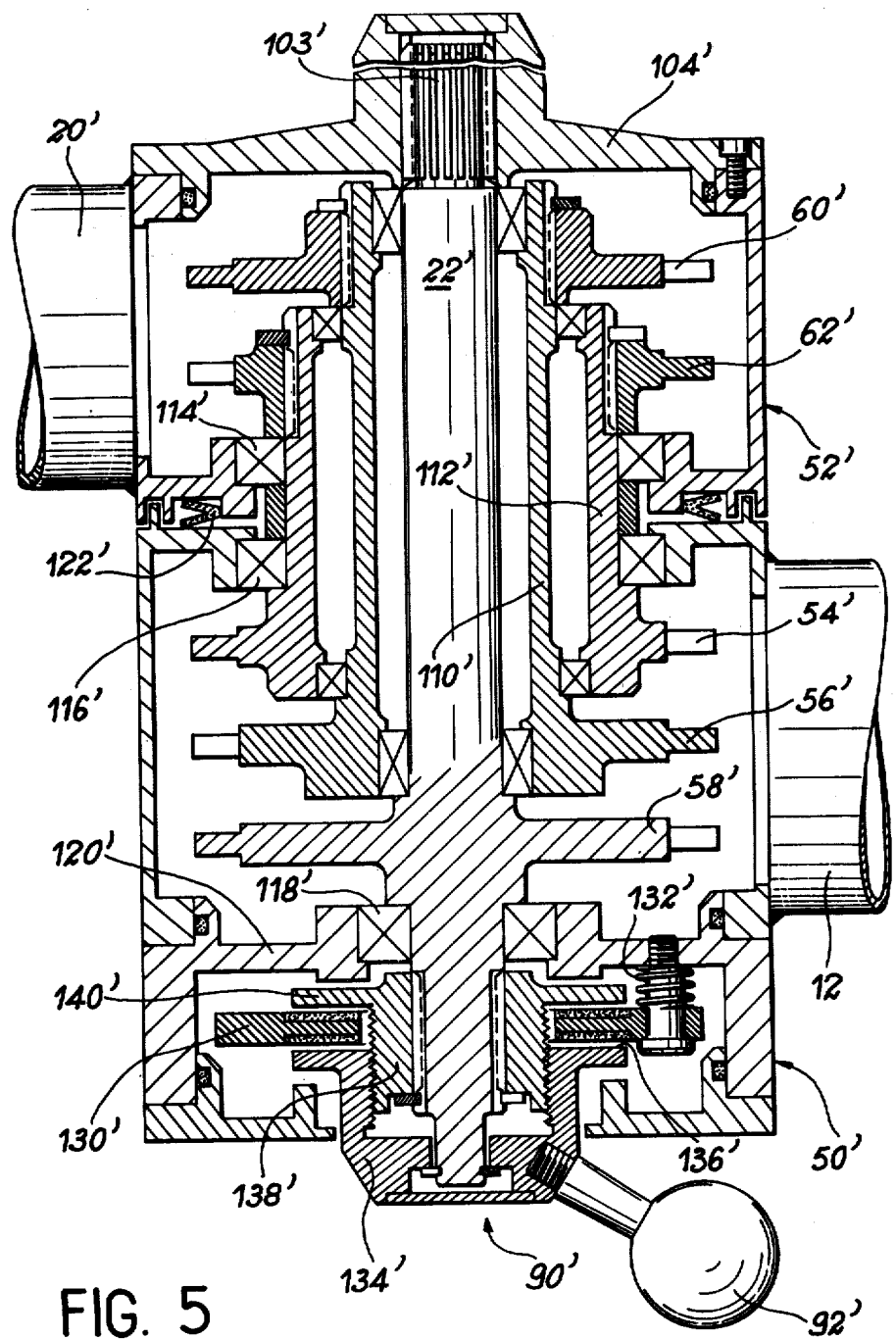
FIGS. 5 and 6 are detail views of FIG. 4 showing the connection between two segments of the master arm and the connection between the central cylindrical body and the penetration plate.

In FIG. 5, there is shown in greater detail the articulation between the central cylindrical body 12 and the segment 20′ of the master arm. The pin 22′ is again shown within the two half-casings 52′ and 50′, said pin being pivotally mounted within the half-casing 50′ while being rigidly fixed to the half-casing 52′, for example by keying of one end 103′ of said pin within the cover-plate 104′ of the half-casing 52′.

The pulleys 60′ and 56′ are both fixed on a hollow shaft 110′ which is pivotally mounted on the pin 22′ by means of roller-bearings. The pulleys 54′ and 62′ are both mounted in like manner on a second hollow shaft 112′ which is pivotally mounted on the shaft 110′ by means of roller-bearings. Similarly, the shaft 112′ is guided within the half-casings 52′ and 50′ respectively by ball-bearings 114′ and 116′. The second end of the pin 22′ is guided in like manner within a web 120′ of the half-casing 50′ by means of ball-bearings 118′. Finally, sealing systems such as those designated by the reference 122′ are provided between the two half-casings 52′ and 50′ which are clearly capable of moving with respect to each other. These seals are protected against spraying of water by means of labyrinth glands.

The brake system designated by the general reference 90′ and actuated by the operating lever 92′ will now be described. This brake system comprises a brake disc 130′ which is secured rotationally to the half-casing 50′, for example by means of the fixing studs designated by the reference 132′ while remaining capable of moving in a direction parallel to the clamping jaws 136′-140′. This brake system further comprises two jaws which are capable of clamping the brake disc 130′. The first jaw is constituted by an outer sleeve 134′ on which is fixed the operating lever 92′ and the annular flange 136′ of which is capable of bearing on one of the faces of the brake disc 130′. The second jaw is constituted by an inner sleeve 138′ which is keyed on the end of the pin 22′. Said inner sleeve has an annular flange 140′ which constitutes the second jaw of the brake system and is intended to be applied against the second face of the brake disc 130′. The inner sleeve 138′ is provided with an externally threaded portion in cooperating relation with an internally threaded portion formed within the outer sleeve 134′. It is understood that, by actuating the operating lever 92′, the two jaws are accordingly clamped against the brake disc 130′, thus rigidly securing the pin 22′ to the half-casing 52′. The two half-casings are thus coupled together and the segment 20′ is locked in position with respect to the central cylindrical body 12.

Figure 6:
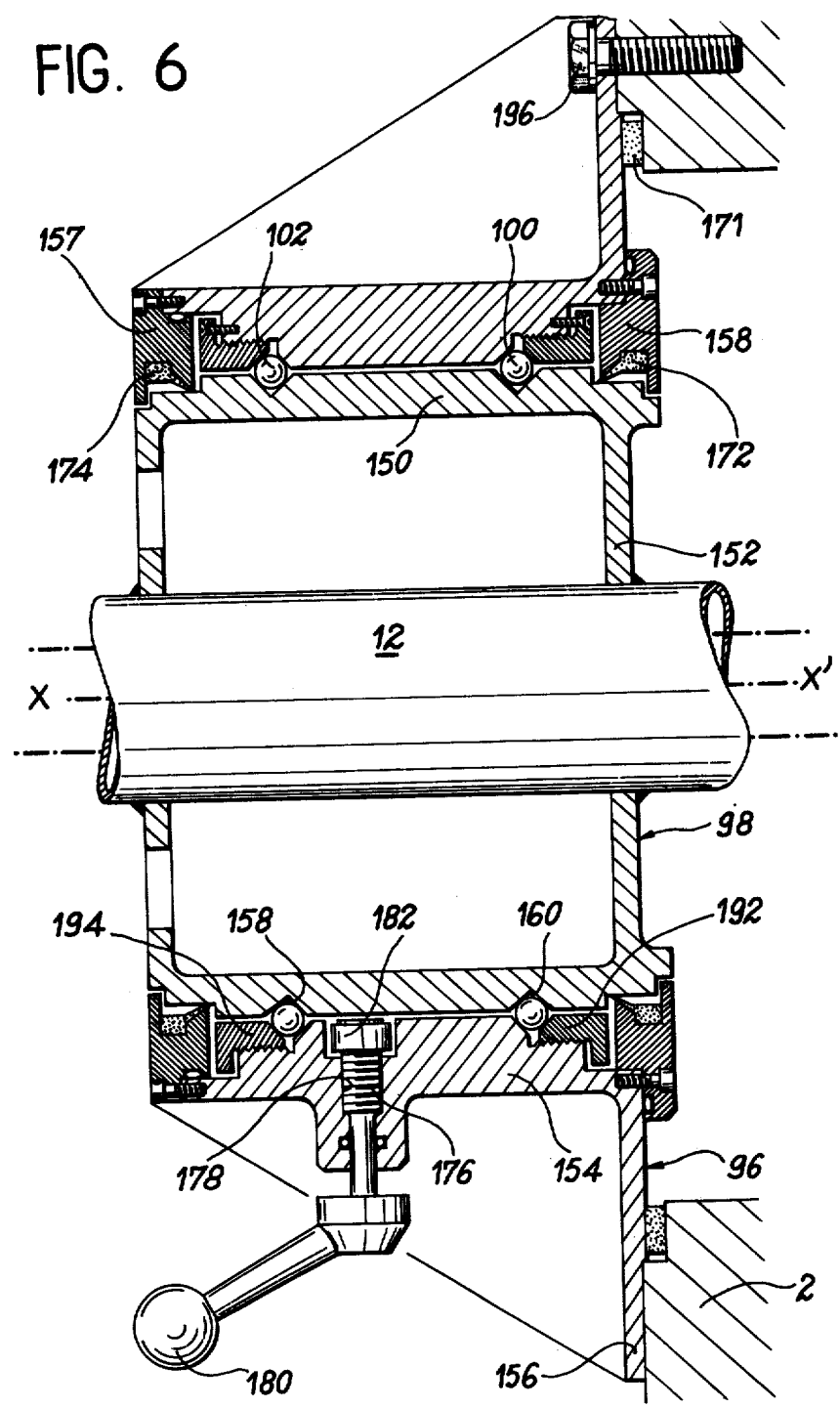

As shown in FIG. 6, the central portion 98 of the support plate is constituted by a cylindrical shell 150 which surrounds the central cylindrical body 12 and is rigidly fixed to said central body by means of webs designated by the reference 152. The webs are provided with six passages or through-tubes 16 which are spaced at intervals along the circumference and serve either to place a lamp or to point a television camera or alternatively to introduce an endoscope. The stationary portion 96 of the support plate also has a cylindrical shell 154 fitted with a plate 156 for fixing the manipulator assembly on the wall 2. Guiding of the shell 150 in rotational motion and locking of this latter in translational motion within the shell 154 is ensured by means of two rings of balls 102 and 100. To this end, two annular recesses 158 and 160 are formed in the outer face of the shell 150. There is thus obtained a certain guiding length for the cylindrical body with respect to the penetration plate (this length being equal to the distance between the two rings of balls). On the side corresponding to the shell 154, the balls are maintained in position by means of screwed retaining rings 192 and 194. The means employed for securing the penetration plate to the wall 2 are represented schematically in the figure by the screw 196. As can readily be understood, leak-tightness is ensured between the plate 156 and the wall 2 by means of the seal 171, for example. Similarly, leak-tightness is ensured between the annular members 157 and 158 and the inner cylindrical shell 150, for example by means of lip seals such as those designated by the references 172 and 174. There is also shown in this figure the brake system constituted by the threaded rod 176 which cooperates with the internal screw-threaded 178 formed in the cylindrical shell 154 in a radial direction. The threaded rod 176 is provided at one end with an operating lever 180 and at the other end with a friction member 182. It is understood that, by actuating the operating lever 180 in the right direction, the friction member 182 is clamped against the outer face of the inner shell 150 and thus locks this latter in position with respect to the cylindrical shell 154. The central cylindrical body 12 is consequently locked rotationally with respect to the wall 2.

It is apparent that, by virtue of the shape and special arrangements of the manipulator in accordance with the invention, there is thus obtained very good balancing of the master arm with respect to the slave arm about the point A, irrespective of the position of the different segments constituting the master arm and slave arm. The arrangement is of particular interest for positioning the slave portion of the manipulator within its work enclosure by virtue of the balancing which is additionally obtained about the axis of the handling trunnion.

What we claim is:

1. A manipulator of the type comprising a master arm and a slave arm and capable of operating within an enclosure limited by a wall provided with an opening for the introduction of said slave arm into said enclosure, wherein said manipulator comprises a central body of cylindrical shape having a longitudinal axis, a penetration plate designed to be fixed on said enclosure wall at the level of said opening, said cylindrical body being pivotally mounted in said plate around said longitudinal axis but not movable translationally along said longitudinal axis, said cylindrical body being provided with a handling trunnion externally of the enclosure, said central cylindrical body being provided with a first and a second extremity, a slave arm being pivoted to said first extremity and constituted by n (where n is strictly greater than 1) segments of generally cylindrical shape mounted in end-to-end relation and articulated with respect to each other, the last segment being fitted with a tool, a master arm pivoted to said second extremity and constituted by n segments of generally cylindrical shape mounted in end-to-end relation and articulated with respect to each other, the last segment being fitted with a control handle and with a balance weight, the segments of the master arm being in an inverted homothetic relationship with those of the slave arm with respect to the point of intersection of the axis of the central cylindrical body with the axis of said trunnion in a negative homothetic ratio equal to $-k$, the weights of the homothetic elements being substantially in a ratio equal to $1/k$, and transmission means constituted by chains, belts, cables or tapes and by pulleys for transmitting the movements of the master arm to the slave arm in such a manner as to ensure at each instant that the angle made by two segments of the master arm and the angle made by the two homothetic segments of the slave arm are equal and opposite, one segment of the master arm being such as to have dimensions equal to k times those of the corresponding segment of the slave arm.

2. A manipulator according to claim 1, wherein the penetration plate has a central portion of revolution which is rigidly fixed to the central cylindrical body and a peripheral portion which can be attached to said wall, said central portion being pivotally mounted in said peripheral portion.

3. A manipulator according to claim 2, wherein the peripheral portion of the plate is constituted by a mounting plate adapted to be attached to said wall and by a cylindrical shell rigidly fixed to said mounting plate, and wherein said central portion of the penetration plate is constituted by a second cylindrical shell in coaxial relation with said central cylindrical body and rigidly fixed thereto, said second cylindrical shell being pivotally mounted within said first shell, said second shell being guided by said first shell over a predetermined distance in a direction parallel to the axis of said cylindrical body, said trunnion axis being such as to intersect the axis of said cylindrical body substantially at the mid-point of the distance aforesaid.

* * * * *